United States Patent [19]

Lang et al.

[11] 4,073,140
[45] Feb. 14, 1978

[54] CONNECTING VALVE FOR RESERVE PUMP

[75] Inventors: Armin Lang, Schwabisch Gmund; Rolf Fassbender, Mutlangen, both of Germany

[73] Assignee: Zahnradfabrik Friedrichshafen AG, Friedrichshafen, Germany

[21] Appl. No.: 668,415

[22] Filed: Mar. 19, 1976

[30] Foreign Application Priority Data

Mar. 21, 1975 Germany .............................. 2512432

[51] Int. Cl.² .............................................. F15B 20/00
[52] U.S. Cl. ......................................... 60/405; 91/468;
417/286; 137/114; 137/117; 137/118
[58] Field of Search ............... 137/101, 111, 112, 114, 137/117, 118, 554; 60/405; 91/468; 417/286

[56] References Cited

U.S. PATENT DOCUMENTS

| 2,440,371 | 4/1948 | Holley, Jr. ...................... 137/117 X |
| 2,905,191 | 9/1959 | Vander Kaay ...................... 137/117 |
| 3,279,558 | 10/1966 | Allen et al. ...................... 137/101 X |
| 3,561,327 | 2/1971 | Stremple ...................... 137/111 X |
| 3,742,970 | 7/1973 | Gross ...................... 137/554 X |
| 3,882,678 | 5/1975 | Fassbender ...................... 137/117 X |

Primary Examiner—William R. Cline
Attorney, Agent, or Firm—Zalkind & Shuster

[57] ABSTRACT

A valve device having a pressure operable valve piston, particularly for booster steering system, to selectively control pressure flow to a consumer device such as a hydraulic servomotor in order to permit use of a reserve pump in event of failure of a main pump. The valve in a neutral position combines the output of both pumps but is responsive to a first increase in the flow rate beyond a predetermined limit to shunt flow from the reserve pump to a sump. Upon further increase in the flow rate the valve piston moves to a position to also shunt part of the output from the main pump to a sump. Signal means is actuated by movement of the valve piston to apprise a vehicle driver that the steering system is operative.

1 Claim, 2 Drawing Figures

CONNECTING VALVE FOR RESERVE PUMP

BACKGROUND OF THE INVENTION

The invention constitutes an improvement over the apparatus shown in U.S. Pat. No. 3,882,678 which relates to connecting a reserve pump into a steering booster system in the event of failure of the main pump, or dropping of pressure. Inasmuch as the pressure flow consumer such as a servomotor is operated at a pressure which is maintained below a certain pressure limit, limiting or regulating valves are used. Also, in such systems wherein a main and reserve pump are used a signal device is generally required to indicate that the system is operative.

In the several prior art arrangements the apparatus utilizes a pressure differential, for example, a metering throttle for operating a valve piston and/or signal means. The several components are generally connected in series so that losses of pressure become cumulative.

For proper operation of series connected valves and indicators a precise sequence of connection of components is required. Such precision of adjustment and relationship of the components requires very close tolerances and, accordingly, high manufacturing expense is involved.

SUMMARY OF THE INVENTION

The present invention overcomes the drawbacks of the prior art systems in a simple construction involving selective shunting of reserve and main pump flow to a sump responsive to predetermined flow rate limits. Any increase in pressure flowing to the consumer is reduced by the shunting of output initially from the reserve pump, and, if need be, subsequently of part of the output of the main pump. Normally, both pumps effect a combined output for actuation of the consumer. By providing a housing which carries a switch actuatable by abutment with a pressure operated valve piston a simple means of effecting a signal showing that the steering system is in readiness for operation can be effected.

BRIEF DESCRIPTION OF THE DRAWING

The invention will now be described in detail in conjunction with the appended drawing in which.

DESCRIPTION OF THE PREFERRED EMBODIMENT

Figure 1:
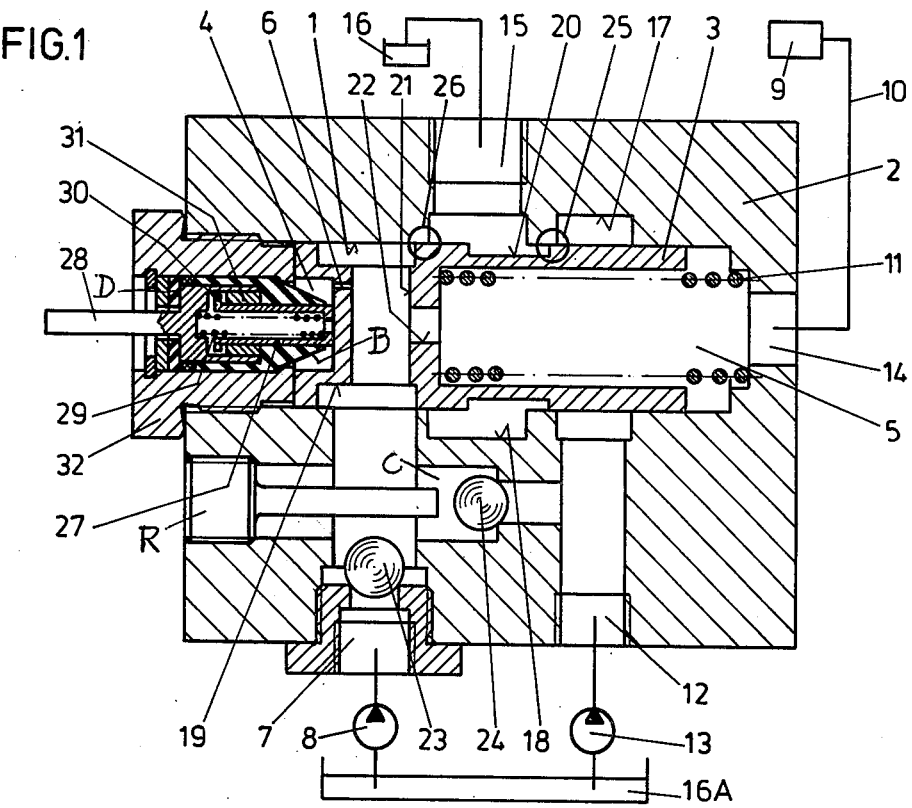
FIG. 1 is a longitudinal cross section showing the essential components of the flow control and stand-by valve of the invention and the electric switch for effecting a signal.

Referring to FIG. 1, housing means having a bore 1 is provided in a valve device comprising housing 2 with a valve piston 3 sealingly slideable in the bore. The ends of the valve piston form walls of respective pressure chambers 4 and 5 in the bore 1.

A small damping bore 6 is provided through one end of the valve piston, as shown, whereby pressure fluid can enter one pressure chamber 4 from a housing passage 7 connected to a main pump 8. The other pressure chamber 5 connects with a consumer 9 such as a hydraulic servomotor by way of a line or conduit 10. No details of the servomotor or steering arrangement etc. need be given since this is well understood.

In pressure chamber 5 a compression spring 11 is disposed abutting the respective end of the valve piston 3 for biasing the valve piston to the position shown in FIG. 1, a neutral position, against a threaded closure plug or bushing 32 at one end of the housing. The housing has a connection passage 12 for a reserve pump 13 and a connection passage 14 for communicating with the consumer 9 as well as a connection passage 15 communicating with a sump or oil tank 16.

Passages 12 and 15 connect with respective internal annular grooves 17 and 18 within the bore 1. Valve piston 3 has an external annular groove 19 in constant communication with the passage 7 for flow from main pump 8 and an external annular groove 20 in constant communication with passage 15 for flow to sump 16.

The valve piston 3 is provided with a radial bore 21 passing through groove 19 and communicating flow from the pumps with pressure chamber 4 via the bore 6. Bore 6 is on one side of radial bore 21 while on the diametrically opposite side is a throttle such as bore 22 leading from the radial bore 21 to pressure chamber 5. Pump output can be blocked by a respective check valve, such as the ball 23 in passage 7 for main pump 8 and the ball 24 in cross passage C, between passages 7 and 12, for reserve pump 13. It will be noted that the check valve balls open downstream, i.e., in the direction to permit combined flow from the respective pumps to the radial bore 21 and thence through pressure chamber 5 to the consumer 9. Obviously, if only one pump is operative the ensuing pressure will close the ball check of the other pump so as not to short circuit into the sump 16A from which both pumps feed.

Check valve 24 is maintained against straying too far from its valve seat by means of the threaded adjustment rod R extending into the cross passage.

Thus, the check valves are openable by pressure from their respective pumps to permit flow to groove 19 of the valve piston and it will be apparent that when both pumps are operating their combined output feeds the consumer 9 with the piston valve in neutral position as shown.

In the event of failure of either pump the other pump will, of course, maintain a pressure for consumer use. At the time that both pumps are operating the neutral position of the piston valve is such that the pump passage 18 is cut off and, accordingly, no flow can take place to the sump 16 from either pump. The passage means provided by the coacting grooves of the housing and the piston valve are dimensioned so that, upon a predetermined flow rate being reached by the combined output of both pumps, the differential pressure existing between the pressure chambers cause movement to a first position of the piston valve compressing the spring 11, opening a gap at 25 whereat the reserve pump 13 output is shunted via passage 12, groove 17, groove 20, groove 18 and passage 15 to sump 16. In the event that flow rate continues to increase beyond a limit predetermined by the compressed spring 11 further movement is affected by the valve piston to a second position whereupon a gap opens at 26 in the passage means and a portion of the output from the main pump 8 shunted via radial bore 21, groove 19 and groove 18 to passage 15 to sump 16. However, the remainder of the main pump output is available to feed the consumer.

It will be appreciated that the pressure at the left side of throttle 22 is greater than that at the right side and hence the pressure in chamber 4, transmitted through bore 6, is greater than that in chamber 5, whence the differential pressure is effective to achieve the desired results as just described. Bore 6 also serves as a damping or cushioning means when the piston valve is returned under spring force to neutral position against closure plug 32.

Thus, upon lowering of flow output of the pumps, spring 11 will return the piston valve 3 to neutral position. To prevent shock the damping bore 6 will cushion the encounter of the face of the piston valve against the threaded plug 32 by control of oil expelled from chamber 4, as well as protecting an indicator means, to be described, from sudden impact.

The indicator means comprises a switch having a metallic conductive arrangement comprising a cup and integral rod 28 effecting a connection terminal and a contact sleeve 27 with a compression spring 29 between the sleeve and cup to maintain contact 27 grounded against the valve piston. The cup and sleeve are in electrical connection by a motion limiting ring 31. The cup will be seen to be biased by spring 29 against an insulating disc D. These components are electrically isolated in the insulating bushing B. The entire assembly is carried in the threaded plug 32 and the contact element 27 has a flange 30 at its outer end abuttable against ring 31 which limits its movement in the direction of the piston valve when the piston valve is shifted. Thus, electrical contact is had between the contact element 27 and the piston valve as the grounded portion of the circuit and upon movement of the piston valve to the right the circuit is opened whence by conventional means a light or sound signal is effected.

The ring 31 by its longitudinal dimension can determine arbitrarily the point at which the signal is given when the piston valve is shifted to separate from contact 27.

Figure 2:
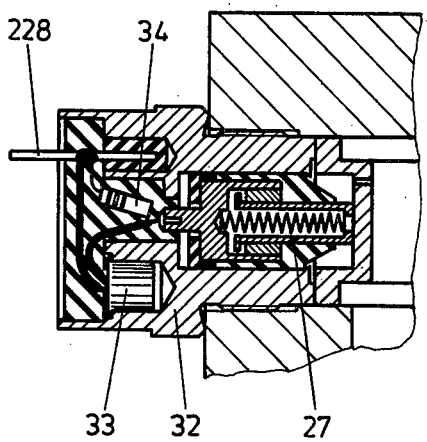
FIG. 2 shows a variation of the switch utilizing a transistor as an electronic switch means.

A variation of the switch is shown in FIG. 2 which utilizes a transistor in order to minimize the amount of current which the switch need carry as between the contact 27 and the piston valve. Thus, in FIG. 22 a transistor 33 has a connection 228 to the emitter while the collector of the transistor is connected with the threaded plug 32'. The base of the transistor is connected to the contact element 27 which connects with the emitter through a resistor 34. Accordingly, very little current is required to energize the transistor for carrying a much heavier current, due to its amplification factor, for the purpose of operating a signal and operation safety and life span are thus increased for the electrical components.

From the above description it will be apparent that precise adjustment of the operational functions of the invention are readily achieved such as flow control and signal indication to effect flow to a consumer with minimum loss of pressure in a compact and simple construction.

We claim:
1. In a booster steering hydraulic system having a main pump (8), a reserve pump (13), and a sump (16), for operating a pressure operated consumer (9);
   a valve device for selectively controlling flow to said consumer device from said pumps comprising housing means (2) having a pair of pressure chambers (4,5) and a bore (1) therebetween;
   a pressure operable valve member (3) movable in said bore, and bias means biasing said valve member to a neutral position within said bore;
   said valve member comprising a valve piston having ends effecting walls of respective pressure chambers one said end comprising a radial wall;
   said valve member ends being exposed to pressure of respective pressure chambers wherein differential pressure is operative to shift said valve member from said neutral position in opposition to said bias means;
   said housing means having pump outlet passages (7,12) and a sump passage (15) for connection to respective pumps and to said sump;
   a radial passage (21) through said valve member radial wall connecting with said pump outlet passages;
   a throttle (22) through said radial wall and said throttle connecting said radial passage with one of said pressure chambers;
   means (11) for communicating said one pressure chamber with a consumer whereby flow from said pumps pass through said throttle to said consumer (9);
   a bore (6) in said radial passage whereby pressure in said radial passage is communicated to the other pressure chamber thereby to effect a differential pressure between said pressure chambers for acting on respective ends of said valve member for actuation thereof;
   coacting flow control means (25,26) in said housing means and in said valve member operative to block flow to said sump in neutral position of said valve member;
   actuation of said valve member to a first position responsive to a predetermined degree of differential pressure between said pressure chambers effecting coaction of said flow control means (25) to direct the flow from said reserve pump to said sump;
   increased pressure differential pressure actuating said valve member to a second position to effect a coaction of said flow control means (26) to also direct a portion of the flow from the main pump to said sump.

* * * * *